Jan. 7, 1936.  I. F. DITTMAR  2,026,521
MACHINE FOR COATING STRIPS OF LUMBER
Original Filed Dec. 7, 1928   7 Sheets-Sheet 1
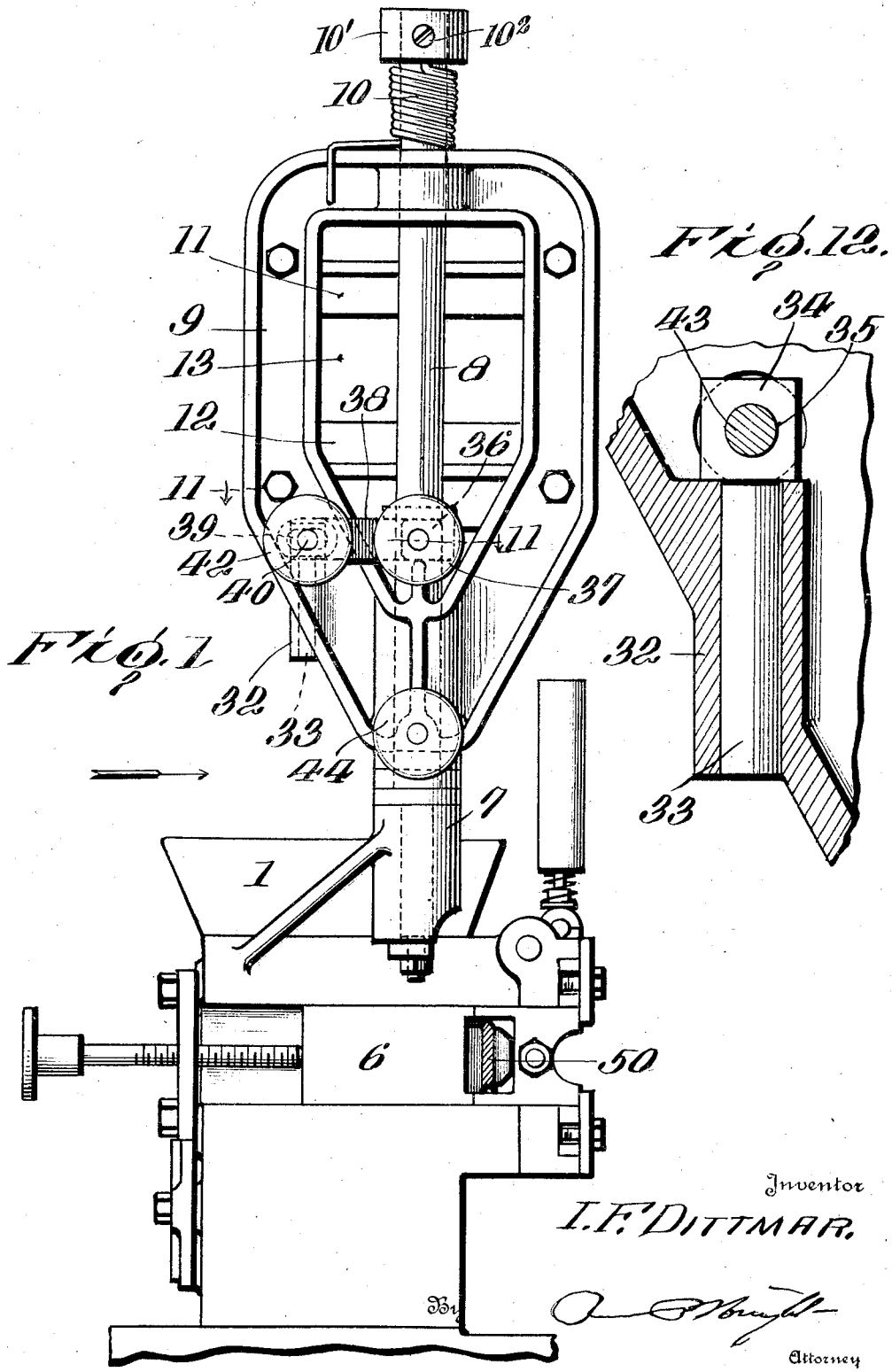
Inventor
I. F. DITTMAR.
Attorney

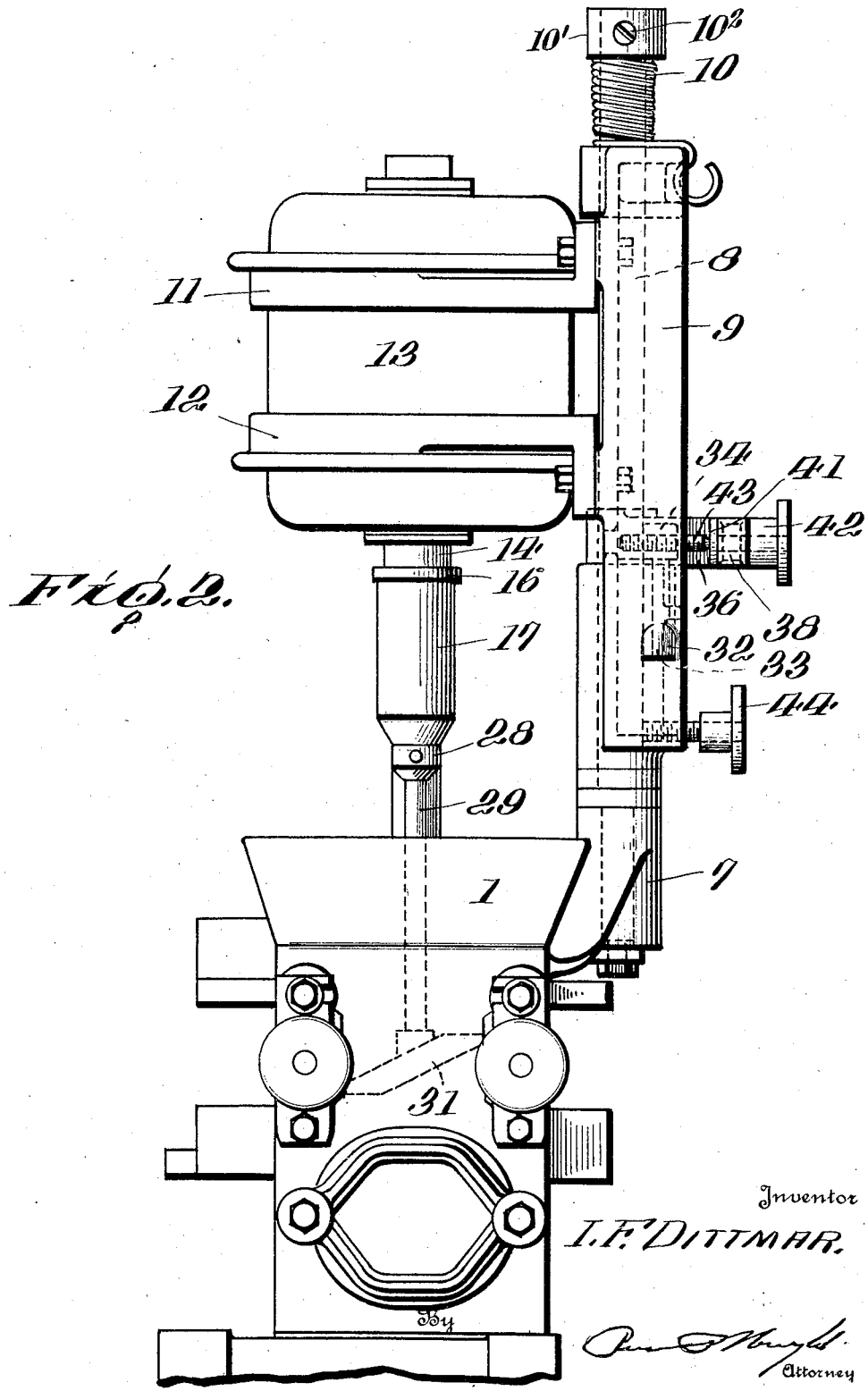

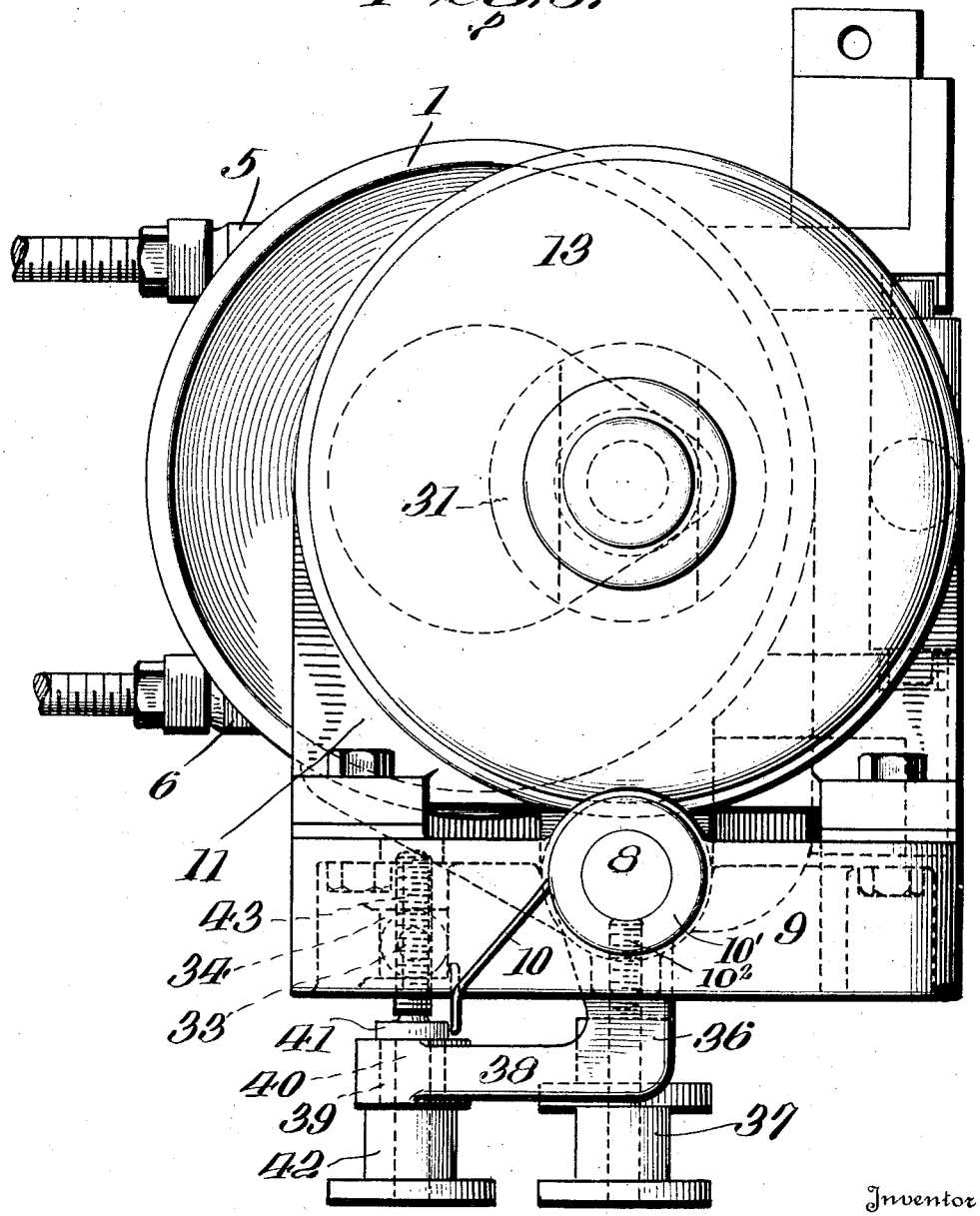

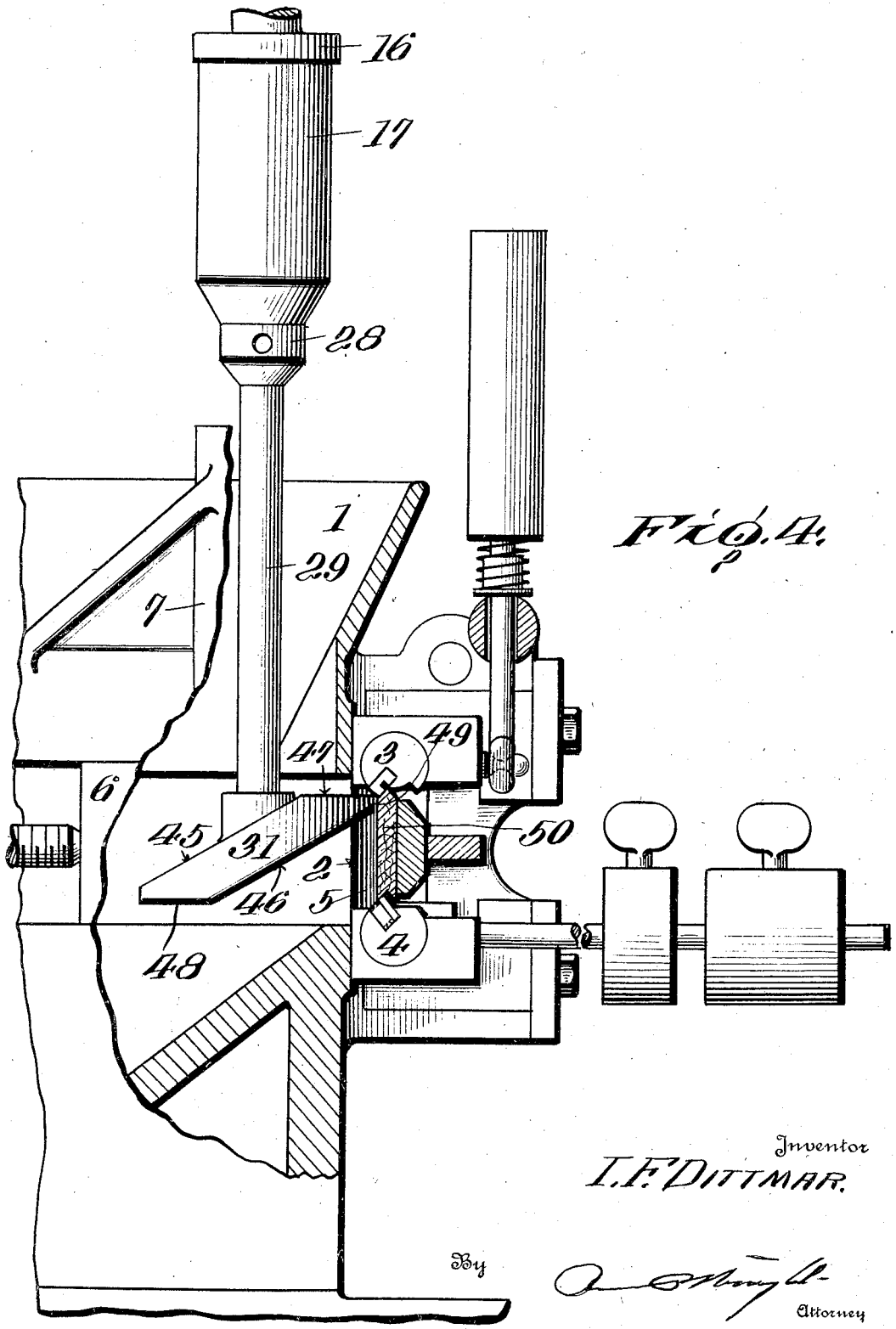

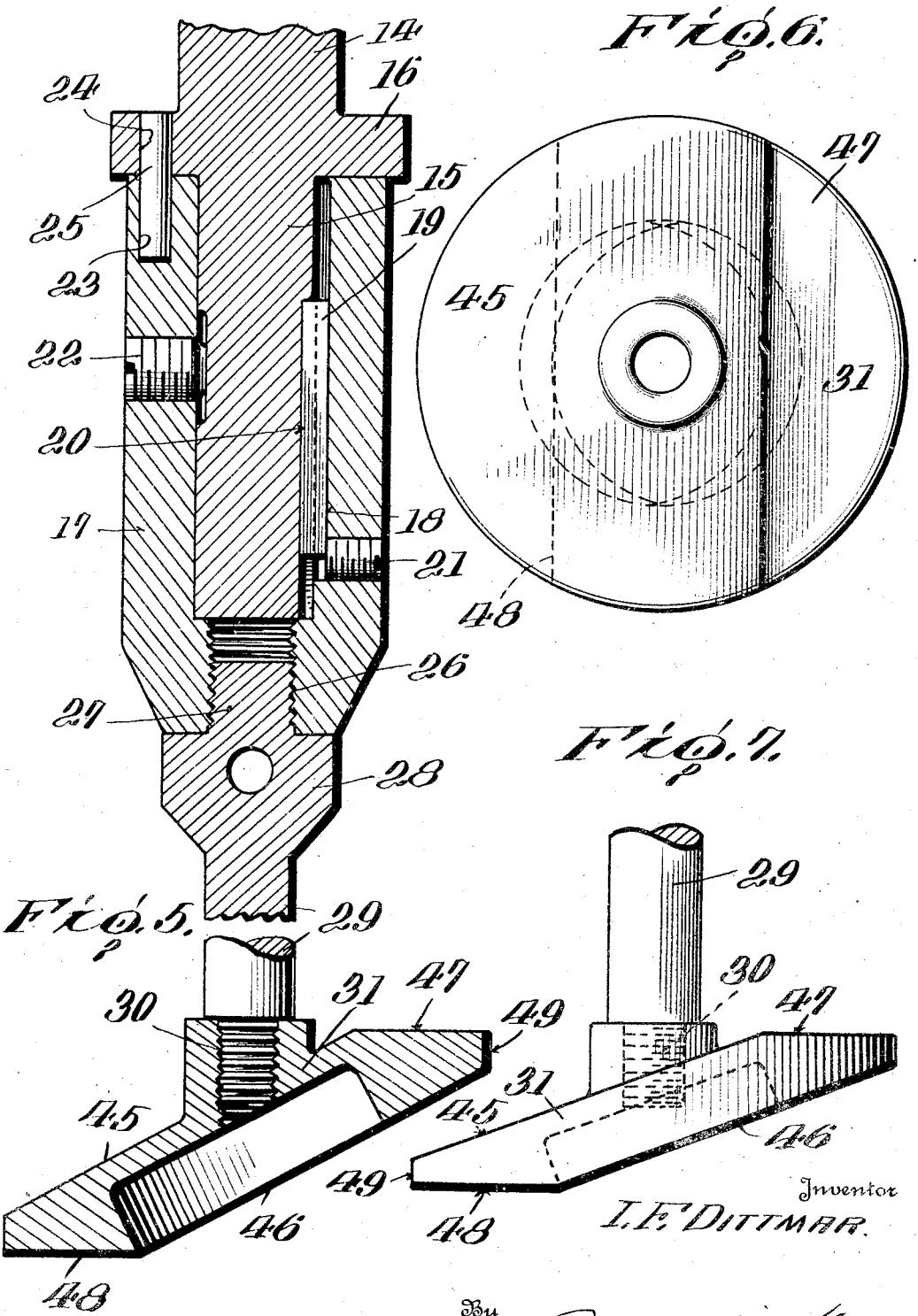

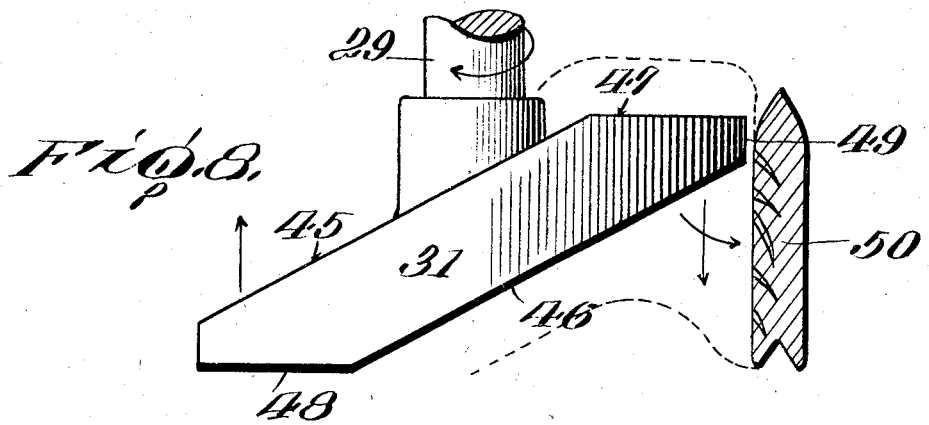
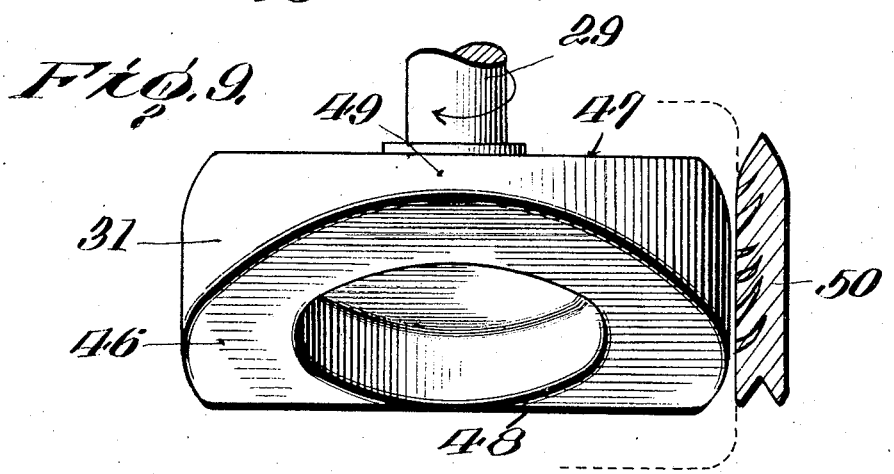
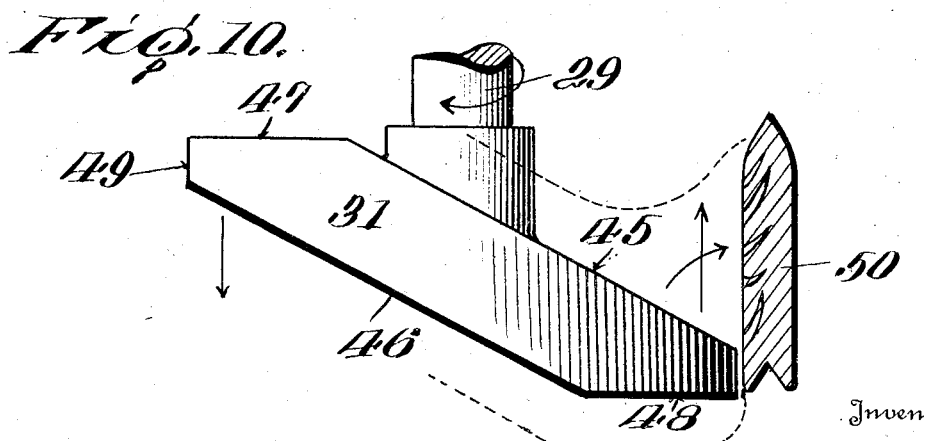

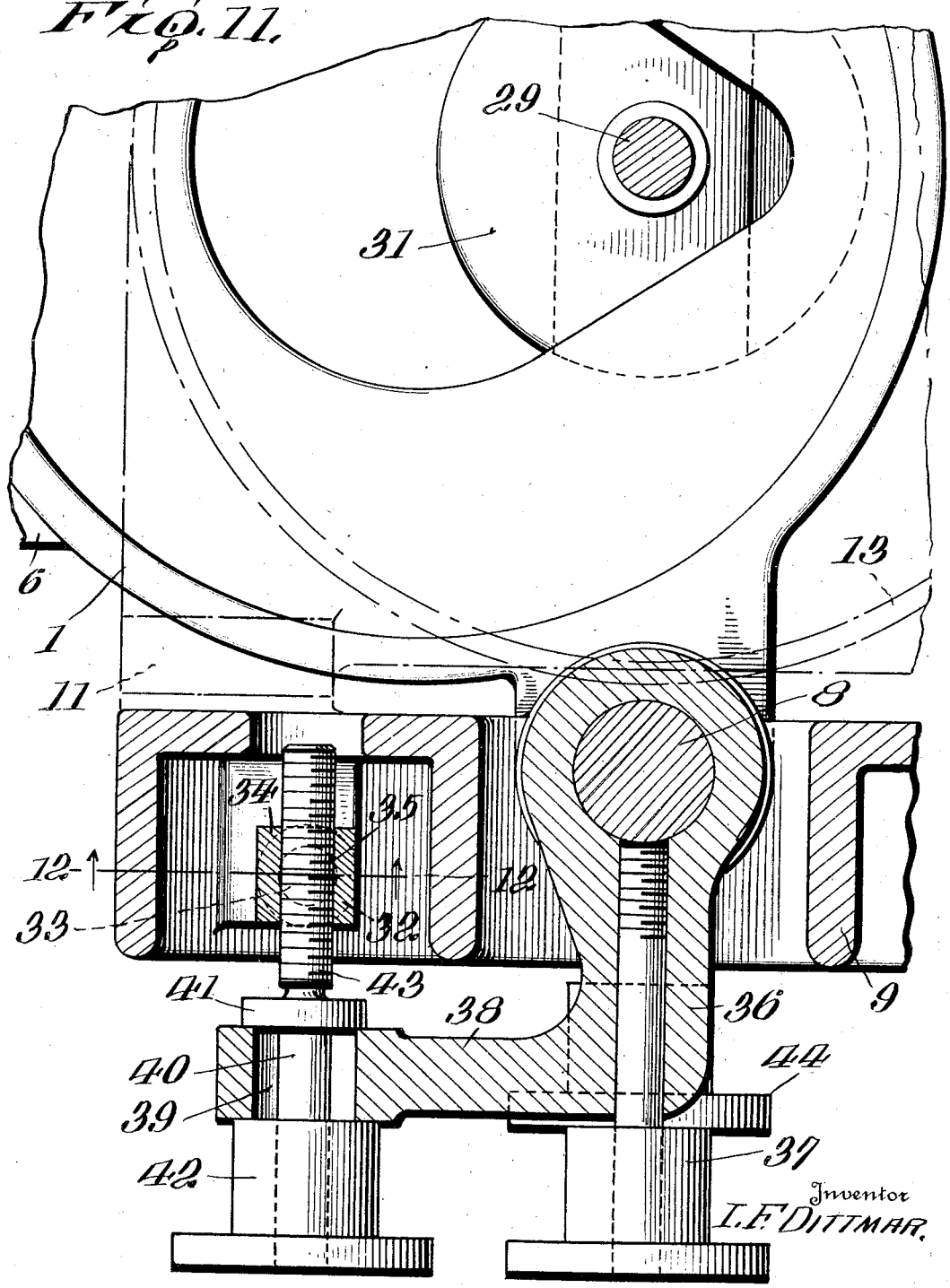

Patented Jan. 7, 1936

2,026,521

UNITED STATES PATENT OFFICE 2,026,521

MACHINE FOR COATING STRIPS OF LUMBER

Irvin F. Dittmar, Williamsport, Pa., assignor to The Cromar Co., Williamsport, Pa., a corporation of Pennsylvania Application December 7, 1928, Serial No. 324,350
Renewed December 12, 1934

13 Claims. (Cl. 91—46)

My invention relates to improvements in strip finishing machines.

The object of my invention is to provide a a certain new and useful improvement in strip finishing machines in which the strips of flooring are rapidly passed through the machine and a filler applied to one face thereof, and the invention pertains more particularly to the means for forcing the filler against the face of the strip of flooring with considerable force or pressure so that it will enter the pores or grain of the wood and at the same time more evenly distribute the filler thereon without any injury to the strip of flooring.

Another object of my invention is to provide a machine of this character in which the combined pressure member and agitator is very rapidly rotated so as to cause it to travel across the entire surface of the strip of flooring throughout its entire length, in its rapid passage through the machine, whereby the filler more thoroughly enters the pores of the wood strip.

A further object of my invention is to provide a machine of this character in which the pressure member and agitator is adjusted so that it can be moved to bring it very close to the inner face of the strip of flooring as it passes through the machine, whereby provision is provided for any wear of the pressure member and agitator and also allowing for the passage of the flooring of slightly different thickness through the machine.

A still further object of my invention is to provide a pressure member and agitator combined in one and so constructed that considerable more pressure is obtained than heretofore obtained to force the filler against the face of the flooring, and the pressure member and agitator traveling across the entire face of the strip of flooring throughout its length.

A still further object of my invention is to provide a machine of this character allowing the strips to pass more rapidly through the machine, and which is simple in construction and very effective in operation and having certain details of structure and combination of parts hereinafter more fully set forth.

In the accompanying drawings:—

Figure 1 is an end view of my improved floor finishing machine showing the motor support mounted on the side of the filler receptacle.

Figure 2 is a side elevation looking in the direction of the arrow at right angles to Figure 1.

Figure 3 is a top plan view of Figure 1.

Figure 4 is a vertical transverse sectional view taken through the filler receptacle showing the combined pressure member and agitator in its operative relation to the strip of flooring passing through the machine.

Figure 5 is an enlarged vertical sectional view of the combined pressure member and agitator showing the manner of attaching it to the lower end of the motor shaft.

Figure 6 is a top plan view of the combined pressure member and agitator removed from the motor shaft.

Figure 7 is a side elevation of the combined pressure member and agitator.

Figures 8, 9, and 10 are side elevations of the combined pressure member and agitator in different positions, in respect to the strip of flooring showing that a wiping action takes place across the entire inner face of the strip of flooring.

Figure 11 is a transverse horizontal sectional view taken on the line 11—11, Figure 1.

Figure 12 is a vertical sectional view taken on the line 12—12, Figure 11.

Referring now to the drawings, I represents the filler receptacle supported on the base in any desired manner, and having a discharge opening 2 having the upper guide member 3, the lower guide member 4 and side guide members 5 and 6, all of which is a separate invention and is fully shown and described in my application Serial No. 324,349, filed Dec. 7, 1928, and therefore a detailed description of the same is not necessary in this application.

The filler receptacle 1 is provided with an outwardly extending rigid arm 7 in which is rigidly secured the upwardly extending vertically disposed shaft 8, and upon which is mounted the frame 9 adapted to oscillate thereon and having a spring 10 exerting a pressure on the frame to normally swing the same in one direction on the shaft, as will be later described. The frame 9 adjacent its upper end is provided with two removable brackets 11 and 12 adapted to support a motor 13 which is arranged directly over the open upper end of the filler receptacle 1. The said motor is provided with a downwardly extending shaft 14, and the lower end of said shaft 14 is reduced as indicated at 15 and provided with a circular flange 16 above said reduced portion. Sliding upon said reduced portion of the motor shaft 14 is a chuck 17 having a key way 18 arranged in one side of the bore thereof and in which the key 19 is free to move, and said key cooperating with a key way 20 in the reduced portion of the motor shaft 14. The key is locked in the chuck by means of set screw 21, and the chuck s locked against longitudinal movement on the reduced portion 15 of the motor shaft 14 by means of set screw 22. The upper end of the chuck 17 is provided with a recess 23, and the flange 16, of the motor shaft 14, is provided with an opening 24 registering with the recess 23 and in which is placed a locking pin 25 serving as an additional means for holding the chuck on the lower end of the motor shaft against rotation.

The lower end of the chuck 17 is provided with an internally threaded opening 26 into which is screwed the reduced end 27 of the shank 28. This shank 28 extends downwardly into the filler receptacle 1 and is provided with a reduced threaded portion 29 adapted to be screwed into the threaded opening 30 of the combined pressure member and agitator 31.

The bracket 9 at one side is provided with a vertically disposed cylindrical portion 32 into which extends a pin 33 rigidly carried by a block 34 which is provided with a horizontal screw threaded opening 35. The shaft 8 has arranged thereon, intermediate its upper and lower ends, an arm 36 locked to the shaft by means of hand screw 37, and said arm 36 extends outwardly and laterally in a horizontal direction, as indicated at 38, to a point opposite the block 34. The laterally turned end 38 of the arm 36 is provided with a slot 39 through which passes a rod 40 having a collar 41 bearing against the inner face of the lateral extension 38 of the arm 36, and on the outside of the arm 36 the rod 40 is provided with a hand wheel 42 by means of which the rod 40 is turned in the slot 39. The inner end of the rod is provided with a screw threaded portion 43 which is screwed through the threaded opening 35 of the block 34. The frame 9 is locked to the shaft 8 by means of the hand screw 44 so that the frame can be readily loosened on the shaft 8. When it is desired to adjust the combined pressure member and agitator to or from the strip of flooring passing by the opening 2 in the receptacle 1, as shown in Figure 4 of the drawings, the set screw 44 is loosened so that the frame 9 is free to move on the shaft 8, and the spring 10 is exerting pressure on the frame 9 tending to move the frame 9 in a direction to move the combined pressure member and agitator horizontally toward the strip of flooring, shown in Figure 4 of the drawings. The frame 9 now being loose on the shaft 8 it will be seen that by turning the hand screw 42 the threaded extension 43 of the rod 40 is screwed through the block 34, moving the frame 9 on the shaft 8 and moving the combined pressure member and agitator horizontally to or from the strip of flooring. After the combined pressure member and agitator is adjusted to its desired position in respect to the strip of flooring, the hand screw 44 is then tightened to lock the frame 9 on the shaft 8.

The motor 13 is a high speed motor and makes between twelve and thirteen hundred revolutions per minute, and therefore the shaft 14 and also the combined pressure member and agitator 31 revolves at the same rate of speed. The combined pressure member and agitator 31 as shown in Figures 6, 7, 8, 9 and 10 of the drawings is of a circular disk form having the oblique upper face 45 and the oblique lower face 46, and cut away forming the two flat horizontal faces 47 and 48 so that the pitch is equal to the width of the inner face of the strip of flooring 50 being treated with the filler.

As heretofore stated, the combined pressure member and agitator 31 rotates at a speed from twelve to thirteen hundred revolutions per minute, and the lower inclined face 46 forces the filler below the same in the direction of the arrow, Figure 8, against the inner face of the strip of flooring, and the upper inclined face 45, as shown in Figure 8, is lifting the filler and forcing it upwardly as shown in Figure 8. When the combined pressure member and agitator reaches the position shown in Figure 10 of the drawings, the upper inclined face 45 is forcing the filler upwardly and outwardly as indicated by the arrow against the face of the strip of flooring. The rapid rotation of the combined pressure member and agitator causes the outer vertical wall 49 to travel across the entire inner face of the strip of flooring, and coming very close to the strip of flooring it will be seen that it will compress the filler between it and the flooring and cause the filler to penetrate the pores of the wood, and at the same time the vertical wall of the combined pressure member and agitator travels across the inner face of the strip of flooring throughout its entire length.

It will be understood that the pressure member and agitator must be rotated at a very high rate of speed, or at such a speed in respect to the speed of travel of the strips through the machine so that the outer edge of the pressure member and agitator will pass over the surface of the strip in its passage through the machine.

The tension of the spring 10 is adjusted by loosening the screw $10^2$ of the collar 10' carried by the shaft 8 so that by rotating the same on shaft 8, and then tightening the screws $10^2$ so as to lock the collar in an adjusted position, I am enabled to apply the proper tension to the frame for the purpose hereinafter fully described.

By releasing the hand screws 37 and 44, the frame 9 is free to be moved by the spring in a direction to bring the pressure member into contact with the strip in its passage through the machine, so that it will be held yieldingly against the strip.

With a machine constructed as above described, various forms of pressure members can be used and the pressure member can be adjusted to revolve at any predetermined distance from the face of the strip, or it can be alloyed to be held resiliently against the face of the strip in its passage through the machine in order to allow it to follow the contour of the strip in its passage therethrough, and this allows the pressure member to move towards or away from the face of the strip passing through the machine.

In the specification I have used the term "semi-liquid" to indicate the application of such materials as wax, lacquers, varnishes, coatings, paints, pastes, oils, etc., which are thicker than water and I have found that various materials can be applied to a strip in a machine constructed in accordance with my invention and therefore I do not wish to limit myself to the application of applying filler to the strip.

Having thus fully described my invention what I claim is:—

1. A machine of the character described comprising a receptacle for applying semi-liquid to a strip in its passage therethrough, a shaft rigidly supported and extending up above the receptacle, a frame oscillating on said shaft, brackets carried by the frame and extending inwardly over the receptacle, a motor mounted on said brackets and having its shaft extending into the receptacle, a pressure member carried by the lower end of the shaft, an arm rigidly carried by the rigidly supported shaft and extending outwardly beyond the frame, a hand screw carried by the outer end of the arm and screwed into a pivoted member carried by the frame whereby the frame can be swung on the shaft for moving the pressure member to or from the strip in its passage through the receptacle.

2. A machine of the character described comprising a receptacle for applying semi-liquid to a strip in its passage therethrough, a shaft rigidly supported and extending above the receptacle, a frame oscillating on said shaft, a motor carried by the frame and extending over the receptacle and having its shaft extending into the receptacle, a pressure member carried by the lower end of the shaft within the receptacle, an arm rigidly carried by the rigidly supported shaft and extending outwardly over one side of the frame, a hand screw rotatably mounted in said arm and passing through a pivoted nut within the frame, whereby the turning of the screw swings the frame on the shaft and moves the motor so as to move the pressure member to or from the strip in its passage through the receptacle.

3. A machine of the character described comprising a receptacle for applying semi-liquid to a strip in its passage therethrough, a shaft rigidly carried by one side of the receptacle and extending above the receptacle, a frame carried by the shaft, a motor mounted on the frame above the receptacle and having a shaft extending into the receptacle, a pressure member carried by the lower end of the motor shaft, a spring carried by the shaft carried by the receptacle and bearing against the frame for moving it in one direction, and means for moving and locking the frame on the shaft so as to move the pressure member to or from the strip in its passage through the receptacle.

4. A machine of the character described comprising a receptacle for applying semi-liquid to a strip in its passage therethrough, a shaft rigidly carried by one side of the frame adjacent one corner, a frame oscillating on said shaft, a spring carried by the shaft and engaging the frame for moving it in one direction, a motor mounted on the frame above the receptacle and having its shaft extending into the receptacle, a pressure member carried by the lower end of the motor shaft, an arm rigidly carried by the shaft carried by the receptacle and extending outwardly beyond the frame, a thumb screw rotatably mounted in said arm for swinging said frame, whereby the frame is adjusted on the shaft to move the pressure member to or from the strip in its passage through the receptacle.

5. A machine of the character described comprising a receptacle for applying semi-liquid to a strip in its passage therethrough, a shaft rigidly carried by one side of the receptacle adjacent the corner, a frame oscillating on said shaft, means for locking the frame on the shaft, a spring on the shaft for normally moving the frame in one direction, a motor carried by the frame above the receptacle and having its shaft extending into the receptacle, a pressure member carried by the lower end of the motor shaft and in a plane with the strip in its passage through the receptacle, an arm rigidly mounted on the shaft carried by the receptacle, and extending outwardly over one side of the frame, a hand screw rotatably mounted in the outer end of the arm and having a threaded portion screwed through a block mounted upon a vertical pivot in the frame, whereby the frame can be moved on the shaft to move the pressure member to or from the strip in its passage through the receptacle.

6. A machine for coating strips of lumber comprising a receptacle having an opening to one side, means for guiding a strip past said opening and preventing the leakage of fluid therearound, and a circular rigid pressure member rotating in the receptacle having a vertically disposed peripheral edge, the upper face of said member being provided with an inclined portion and a horizontally disposed portion, the lower face of said member being provided with an inclined portion and a horizontal disposed portion, the inclined portions of said member causing the fluid to be forced into engagement with the strip in its movement therethrough in a diagonal downward and upward direction under pressure as the member rotates, and the vertically disposed edge causing the fluid to be forced into engagement with the strip under pressure in a horizontal direction.

7. A machine of the character described comprising a receptacle having an opening to one side, means for guiding a strip past said opening and preventing the leakage of fluid therearound, a circular rigid pressure member rotated in the receptacle having a vertically disposed peripheral edge spaced from the strip in its passage through the receptacle, the upper face of said member being provided with an inclined portion and a horizontal portion, the lower face of said member being provided with an inclined portion and a horizontally disposed portion, the horizontally disposed portions of said member being out of vertical alignment, the inclined portions of said member causing the fluid to be forced into engagement with the strips in a diagonal downward and upward direction and the vertical edge of said member causing the fluid to be forced into engagement with the strip in a horizontal direction as said member rotates.

8. A machine for coating strips of lumber having an opening to one side, means for guiding a strip past said opening and preventing the leakage of fluid therearound, and a circular rigid pressure member rotating in the receptacle having a vertically disposed peripheral unbroken edge, the upper face of said member being provided with an inclined portion, the lower face of said member being provided with an inclined portion, the inclined portions of said member causing the fluid to be forced into engagement with the strip in its movement therethrough in a diagonal downward and upward direction under pressure as the member rotates and the vertically disposed unbroken edge causing the fluid to be forced into engagement with the strip under pressure in a horizontal direction.

9. A machine of the character described, comprising a receptacle for applying semi-liquid to a strip in its passage therethrough, a frame mounted to oscillate above said receptacle, a driven shaft mounted in said frame, a pressure member carried by said shaft adapted to engage the strip in its passage therethrough, and means for yieldingly holding said pressure member in contact with said strip in its passage therethrough.

10. A machine of the character described, comprising a receptacle for applying semi-liquid to a strip in its passage therethrough, a vertically disposed shaft arranged above said receptacle, a frame mounted to oscillate above said shaft, a motor carried by said frame having its shaft extending into said receptacle, a pressure member carried by the lower end of said shaft and resilient means for oscillating said frame to hold said pressure member yieldingly in contact with the face of the strip in its passage through the machine.

11. A machine of the character described comprising a receptacle for applying semi-liquid to the strip in its passage therethrough, a fixed shaft extending above the receptacle, a frame oscillating on said shaft, a motor carried by the frame having its shaft extending into the receptacle, a pressure member carried by the lower end of said shaft, a spring surrounding the rigidly supported shaft, and having one end connected thereto, the free end of said spring engaging said frame for resiliently moving said frame towards the strip to hold the pressure member yieldingly in contact with the strip in its passage through the machine.

12. A machine of the character described comprising a receptacle for applying semi-liquid to a strip in its passage therethrough, a frame mounted to oscillate above said receptacle, a motor mounted in said frame having its shaft extending into the receptacle, a pressure member carried by the lower end of said shaft, and a spring for moving said frame in one direction to resiliently hold said pressure member in contact with the face of the strip in its passage therethrough.

13. A machine of the character described comprising a receptacle for applying semi-liquid to a strip in its passage therethrough, a driven shaft extending into said receptacle and mounted to move towards and away from the strip, a pressure member carried by said shaft having an unbroken peripheral edge and means for yieldingly holding said pressure member in contact with the face of the strip in its passage therethrough.

IRVIN F. DITTMAR.